United States Patent [19]
Hill

[11] Patent Number: 5,357,818
[45] Date of Patent: Oct. 25, 1994

[54] INTERCHANGEABLE ENGINE MOUNTING

[76] Inventor: James W. Hill, 10 Rasor Dr., Greenville, S.C. 29609

[21] Appl. No.: 79,883

[22] Filed: Jun. 23, 1993

[51] Int. Cl.⁵ .................... F16M 13/00; H02K 5/00
[52] U.S. Cl. ........................ 74/16; 248/646; 310/75 D; 310/91; 403/306
[58] Field of Search .................. 74/16, 421 R, 421 A; 108/143; 312/349; 24/402.03, 402.08; 403/331, 353, 306; 248/221.3, 223.4, 676, 680, 681, 646; 310/91, 75 D

[56] References Cited

U.S. PATENT DOCUMENTS

| | | | |
|---|---|---|---|
| 963,755 | 7/1910 | Forslund | 310/91 |
| 1,707,203 | 3/1929 | Thornley | 248/676 |
| 2,028,282 | 1/1936 | Hoe | 74/16 |
| 2,881,519 | 4/1959 | Gardner | 30/166 |
| 3,019,709 | 2/1962 | Teason | 248/223.4 X |
| 3,941,002 | 3/1976 | Tucker, Jr. | 74/16 |
| 4,446,679 | 5/1984 | Thomas | 56/2 |
| 4,501,332 | 2/1985 | Straayer | 172/41 |
| 4,597,203 | 7/1986 | Middleton | 56/2 X |
| 4,615,117 | 10/1986 | Flath | 30/122 |
| 4,757,786 | 7/1988 | Ellegard | 123/2 |
| 4,976,637 | 12/1990 | Newell et al. | 440/49 |
| 4,989,323 | 2/1991 | Casper | 30/296.1 |

FOREIGN PATENT DOCUMENTS

| | | | |
|---|---|---|---|
| 493956 | 6/1953 | Canada | 74/16 |
| 869687 | 1/1953 | Fed. Rep. of Germany | 248/676 |

*Primary Examiner*—Allan D. Herrmann
*Attorney, Agent, or Firm*—Richard C. Litman

[57] ABSTRACT

An adapter for manual attachment and removal of a flanged motor on a power driven appliance. A bracket attaches to the appliance and cooperatively receives the motor flange. Pins incorporating clips or expanding projections then secure the motor to the appliance. A shaft-to-shaft connector is then secured by similar pins, thus coupling the motor output shaft and appliance power input shaft. For belt driven appliances, the motor output shaft terminates in a pulley, or is coupled to a shaft having a pulley and attached to the appliance. Optionally, a belt tensioning pulley is included.

9 Claims, 3 Drawing Sheets

INTERCHANGEABLE ENGINE MOUNTING

BACKGROUND OF THE INVENTION

1. FIELD OF THE INVENTION

The present invention relates to apparatus for detachably attaching a small motor to any one of a number of appliances which can be driven by that motor.

2. DESCRIPTION OF THE PRIOR ART

Supplying motorized power selectively to plural motor driven appliances has been contemplated in the prior art. An example of attaching an additional appliance onto another is seen in U.S. Pat. No. 4,597,203, issued to Carlisle A. Middleton on Jul. 1, 1986. Middleton modifies a basic snowblower to include any of several appliances to be added to the basic structure in piggyback style. Most, if not all, of the original structure is retained, only the power output being necessary for the new purposes.

Another example of utilizing a complete appliance only for power, the basic structure being attached to a new appliance, is seen in U.S. Pat. No. 4,446,679, issued to Perry W. Thomas on May 8, 1984. A relatively unmodified lawnmower is mounted atop another appliance, and, again, only the power output is utilized.

It has also been proposed to change the function of a specific powered appliance by substituting a new working head for the original. Examples include U.S. Pat. Nos. 2,881,519, issued to Donald B. Gardner on Apr. 14, 1959; 4,501,332, issued to Robert 0. Straayer on Feb. 26, 1985; 4,976,637, issued to William K. Newell et al. on Dec. 11, 1990, and 4,989,323, issued to Kim P. Casper et al. on Feb. 5, 1991. In these four examples, a hand carried, gasoline powered appliance is provided with a tool or working head for accomplishing a new purpose.

In U.S. Pat. No. 4,615,117, issued to Ronald Flath on Oct. 7, 1986, a chain saw is modified to be able to power, selectively, plural devices. However, the resultant power plant is limited to applications wherein the chain and its connection to the motor are retained, and direct connection between the motor and a driven appliance is not easily accomplished.

U.S. Pat. No. 4,757,786, issued to Sidney W. Ellegard on Jul. 19, 1988, illustrates a detachable engine mounting suitable for driving large appliances. The manual attachment scheme employed by Ellegard differs in structure with the present invention.

None of the above inventions and patents, taken either singly or in combination, is seen to describe the instant invention as claimed.

SUMMARY OF THE INVENTION

While interchangeability or ready attachment and detachment of motors generally has been addressed in the prior art, it remains the focus of the present invention to provide interchangeable engine mounting within a particular context. That is, motors having power within the range of one-half horsepower (one-third kilowatt) to ten horsepower (seven and one-half kilowatts), as employed to drive large appliances. Large appliances are those which, by virtue of size or function, are wheeled, if mobile, or stationary, and could include pumps, generators, air compressors, circular saws, log splitters, snow blowers, small tractors and similar garden appliances, among still others.

The present invention provides a bracket which engages a cooperating flange secured to the power plant in a manner which positively prevents rotation, once the power plant is in place. The same arrangement also positively prevents displacement in two orthogonal axes, only axial displacement being permitted.

The flanged motor is slid into the bracket, and secured thereto by spring biased pins. These pins are arranged to control the axial displacement discussed above.

The motor output shaft is coupled to an appliance input shaft by a collar which telescopes over both shafts, and is secured by pins inserted into radial bores extending through both shafts and through the collar. Coupling in this fashion is desirable because it obviates the need for extreme precision in locating the motor mounting components so that nearly perfect alignment between input and output shafts is achieved. A small degree of play between shafts can be accommodated by a suitable collar.

Pins may have retention clips inserted into radial through-bores, or may have spring biased members causing a projection to expand outwardly, thus increasing the effective diameter of the pin. The latter arrangement will effectively secure the pin in place when the spring biased projecting portion emerges from a bore into which the pin has been inserted. Such devices are well known in the mechanical arts and need no further description. For brevity, the term "pin", when employed herein, will be understood to refer to one of these types of pins.

The invention also works with belt driven appliances, in which case the output shaft is provided with a pulley. A belt tensioning device is optionally provided for clutching as well as to control belt slippage or dislocation.

Accordingly, it is a principal object of the invention to provide an interchangeable engine mounting which enables a motor to be readily installed and removed on a motor driven appliance manually, without tools.

It is another important object of the invention to provide securement for a readily installed and removed motor which positively constrains the motor against rotation about the axis of a power output shaft, and also constrains the motor against displacement in two orthogonal axes.

It is a further object of the invention to provide a bracket into which the flange slides in a linear fashion.

Still another object of the invention is to provide a readily installed and removed motor for use with a belt driven appliance.

An additional object of the invention is to provide a readily installed and removed motor which provides belt tensioning, whereby power is selectively connected and disconnected to the appliance while the motor continues to run.

It is still an additional object of the invention to provide a connection between a motor output shaft and an appliance input shaft which is secured by insertion of pins into aligned holes.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
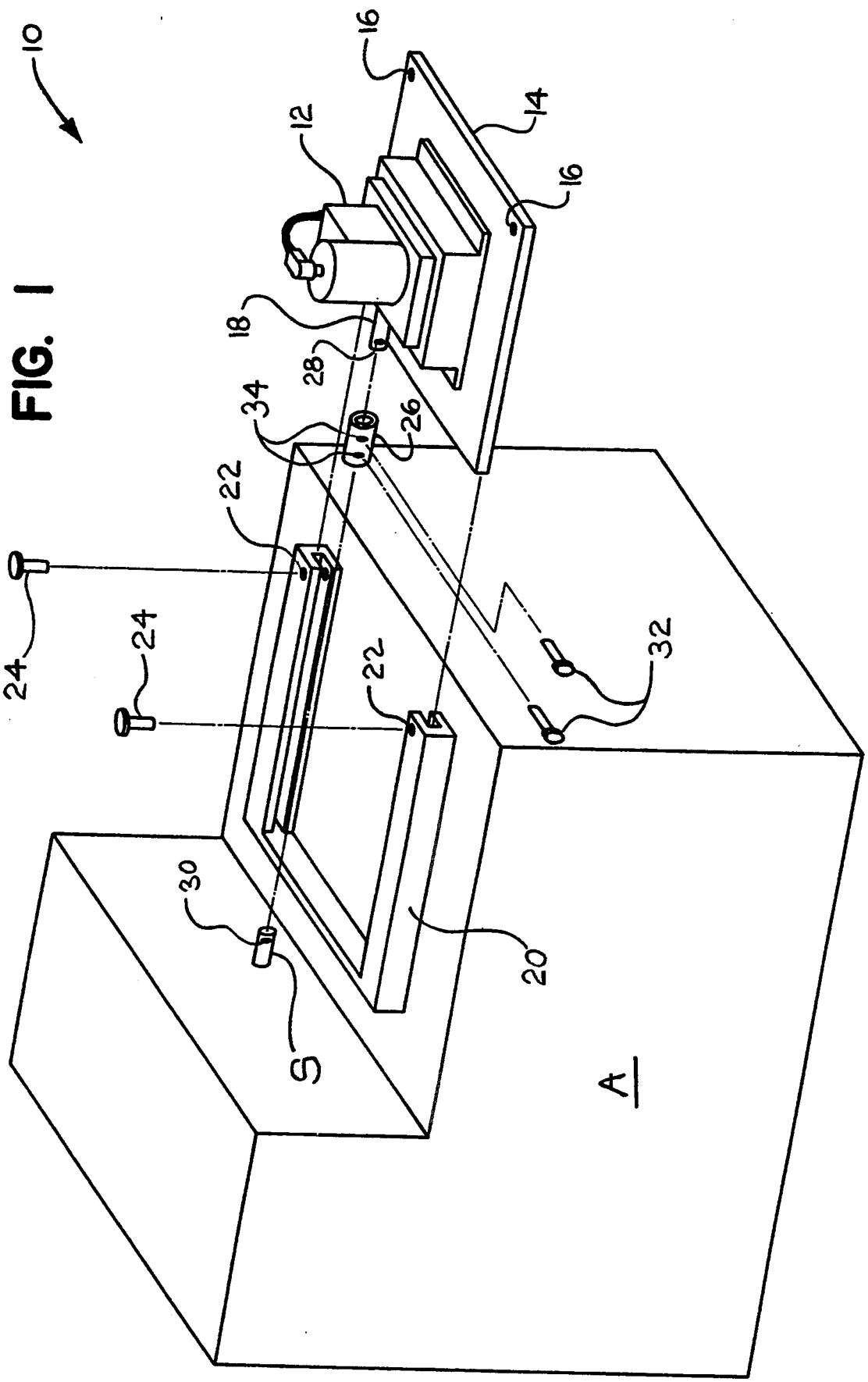
FIG. 1 is a perspective, partially exploded, diagrammatic, environmental view of the present invention.

Referring first to FIG. 1, a first embodiment of the novel interchangeable engine mounting 10 is seen, wherein a driven appliance A has an input shaft S for receiving rotary power. A removable motor 12 is provided with a mounting flange 14 having two holes 16,16 and with an output shaft 18 extending toward appliance A, output shaft 18 preferably aligning with input shaft S. Of course, motor 12 will be understood to include conventional motor starting means and controls (neither shown).

Secured to appliance A is a bracket 20, which is formed to surround flange 14. Bracket 20 has two holes 22,22 which will align with respective flange holes 16,16, so that when motor 12 is in its operable position, alignment will enable pins 24,24 to be inserted therein. Motor 12 is now secured in place.

A collar 26, which has been slipped over either input shaft S or output shaft 18, is positioned to overlap radial through-bores 28 and 30, formed respectively in motor output shaft 18 and appliance input shaft S. Pins 32,32 are then inserted through holes 28,30 and holes 34,34 formed in collar 26. Output shaft 18 and input shaft S are now coupled. When motor 12 is started, appliance A will be operable.

Figure 2:
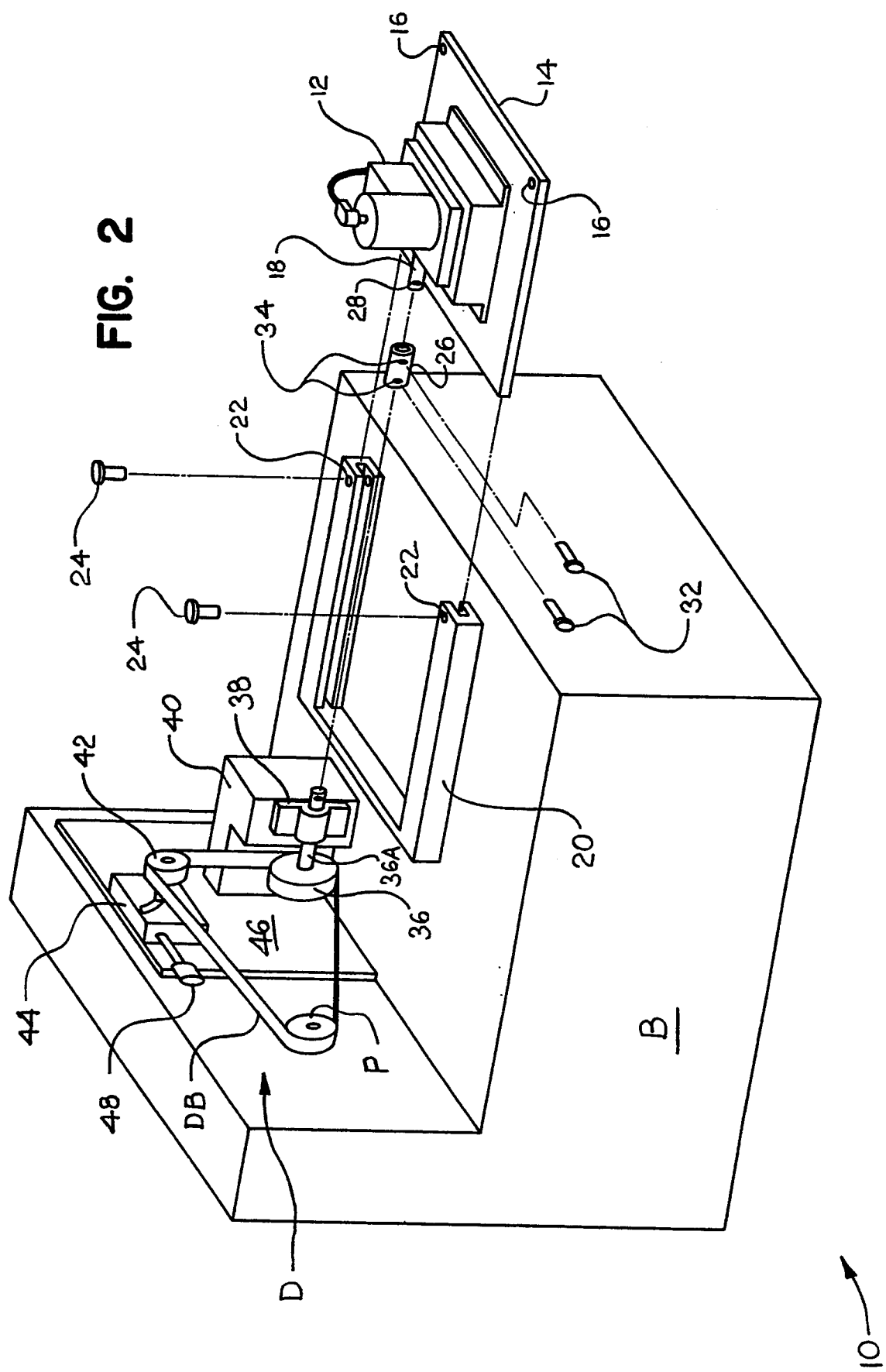
FIG. 2 is a perspective, partially exploded, diagrammatic, environmental view of an alternative embodiment of the present invention.

Turning now to FIG. 2, a second embodiment of the interchangeable engine mounting 10 is shown wherein an appliance B has a belt drive D. In this situation, the appliance input shaft (not shown) has an input pulley P which must operably engage drive belt DB.

The same flanged motor 12 and bracket 20 from the first embodiment are installed as previously discussed. A drive pulley 36, supported on its shaft 36A in a pillow block bearing 38 secured to a bearing bracket 40, is positioned to engage drive belt DB. In this embodiment, motor output shaft 18 is coupled to pulley shaft 36A with collar 26 and pins 32,32, as previously discussed. This arrangement renders a single motor attachable to both shaft driven and belt driven appliances.

For those applications requiring constant motor operation and clutching of motor 12 to appliance input pulley P, a tensioning pulley 42 is provided. Pulley 42 includes tensioning apparatus 44 for pivotally mounting pulley 42 to appliance B, which tensioning apparatus 44 includes a mounting flange 46 and a handle 48 for pivoting pulley 42 about an arc. Structure of tensioning apparatus 44 is of any well known arrangement, and pivoting increases and relaxes belt tension in conventional manner.

Figure 3:
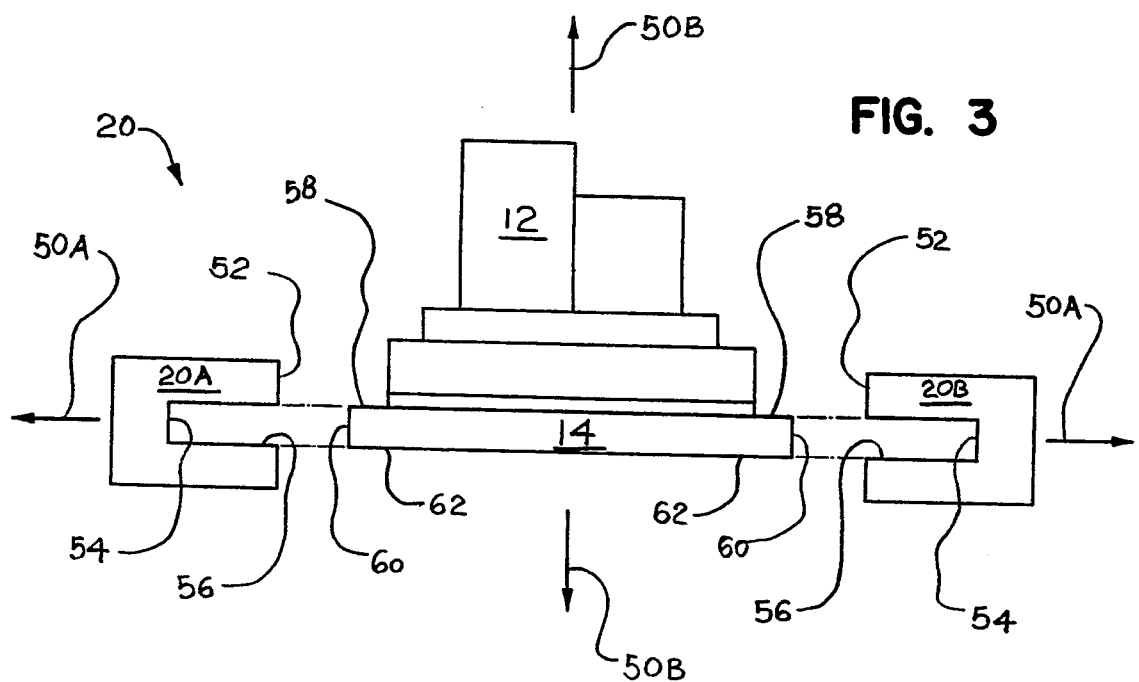
FIG. 3 is a diagrammatic, exaggerated, front elevational detail view showing cooperating structure of the flange and its associated bracket.

In either embodiment, and as illustrated in FIG. 3, bracket 20 surrounds flange 14 so as to prevent movement of flanged motor 12 along either of the two orthogonal axes 50A, SOB. in FIG. 3, bracket members 20A,20B are shown spaced apart in exaggerated fashion, in order to call attention to surfaces 52,54,56 formed in bracket 20. Surfaces 52,54,56 are each parallel to and, collectively, cooperate with, corresponding surfaces 58,60,62 formed in flange 14. Of course, in its true configuration, bracket 20 closely surrounds flange 14.

Flanged motor 12 can slide only axially, with respect to its output shaft 18, when engaging bracket 20. Interference of flange 14 with bracket 20 stops flanged motor 12 prior to contacting input shaft S. This spares both motor 12 and input shaft S, and associated apparatus (not shown), damage which might arise from impact.

Surfaces 52,54,56 of bracket 20 are both straight and parallel to cooperating surfaces 58,60,62 of flange 14. This is important, since this arrangement enables flanged motor 12 to be slid in a single motion directly into operative position without precise maneuvering, and because torsion, which might otherwise cause misalignment of output shaft 18 and input shaft S, is thereby controlled. Forces acting in the axial direction will be of small magnitude, and easily resisted by pins 24,24.

Figure 4:
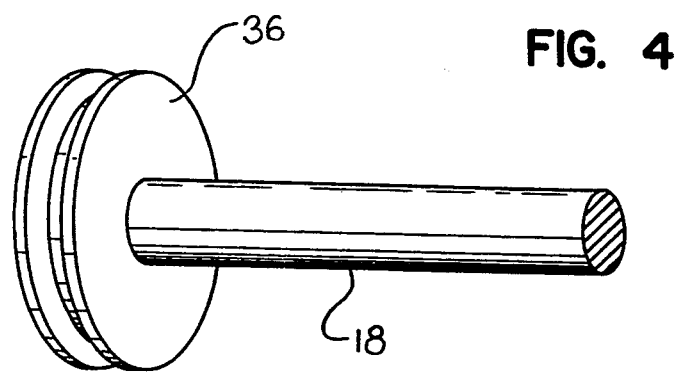
FIG.4 is a perspective detail view of an alternative embodiment motor output shaft having a pulley.

In a further embodiment wherein appliance B includes a belt drive D, and as seen in FIG. 4, it would be possible to attach drive pulley 36 directly to motor output shaft 18. This arrangement simplifies successive installation of motor 12 in plural belt driven appliances B. In this embodiment, separate pillow block bearing 38 (see FIG. 2) is eliminated. Belt tensioning pulley 42 (also seen in FIG. 2) is still optionally used.

A readily installed and removed engine mounting 10 is thus provided which requires no more than four manually inserted and withdrawn pins 24,24,32,32 to effect secure, operable attachment of motor 12 to appliance A or B. Once motor bracket 20, and, if required, bearing bracket 40 and tensioning apparatus flange 46 are installed, motor 12 is easily installed in and removed from an appliance A or B. Collar 26, where used, and pins 24,24 and 32,32 are easily retained with motor 12 by inserting the same into holes 22,22 and 34,34, so that motor 12 can be carried about and attached to a different appliance A or B.

It is to be understood that the present invention is not limited to the embodiments described above, but encompasses any and all embodiments within the scope of the following claims.

I claim:

1. Apparatus for interchangeably powering an appliance having an input device including an appliance through-bore, said apparatus comprising:

a motor having an output shaft for supplying rotary power, a motor through-bore, and a flange;

a bracket for surroundably cooperating with said flange, whereby said motor is slid into an operative position with respect to said bracket; and connectors for locking said flange to said bracket;

power connection means for connecting said output shaft to the appliance input device, said power connection means including a plurality of locking pins, a collar, a first collar through-bore, and a second collar through-bore;

wherein said collar is slipped over said power output shaft and at least one of said locking pins cooperates through said first collar through-bore and said motor through-bore;

whereby said collar is constrained against relative rotation and axial movement therewith by at least one of said locking pins and whereby at least another one of said locking pins cooperates through said second collar through-bore and the appliance through-bore.

2. The apparatus according to claim 1, wherein one of said flange and said bracket surrounds the other of said flange and said bracket on three sides, thus immobilizing said flange and said bracket against mutual separation in two orthogonal axes.

3. The apparatus according to claim 2, wherein said flange includes at least one straight surface and said bracket includes at least one cooperating straight surface, whereby said flange is slid linearly into engagement with said bracket to an operative position with respect thereto.

4. The apparatus according to claim 3 said bracket at least one cooperating straight surface being oriented parallel to the appliance input shaft and said motor output shaft being oriented parallel to the appliance input shaft, whereby alignment ensues between said motor output shaft and the appliance input shaft when said motor and said flange are slid into operative position with respect to said bracket.

5. Apparatus for interchangeably powering an appliance having an input device including an appliance through-bore, an appliance pulley, a drive pulley connected to the appliance through-bore, and a drive belt coupling the drive pulley to the appliance pulley, said apparatus comprising:

a motor having an output shaft for supplying rotary power, a motor through-bore, and a flange;

a bracket for cooperating with said flange, whereby said motor is slid into an operative position with respect to said bracket; and connectors for locking said flange to said bracket;

power connection means for connecting said output shaft to the appliance input device, said power connection means including a plurality of locking pins, a collar, a first collar through-bore, and a second collar through-bore; and a pivotally mounted pulley for engaging the drive belt between the appliance pulley and the drive pulley, whereby said pivotally mounted pulley increases and decreases tension on the drive belt;

wherein said collar is slipped over said power output shaft and at least one of said locking pins cooperates through said first collar through-bore and said motor through-bore, whereby said collar is constrained against relative rotation and axial movement therewith by at least one of said locking pins, and wherein at least another one of said locking pins cooperates through said second collar through-bore and the appliance through-bore.

6. The apparatus according to claim 5, wherein said pivotally mounted pulley further includes means for pivoting said pulley about an arc.

7. The apparatus according to claim 5 wherein said bracket surrounds said flange to immobilize said flange and said bracket against mutual separation along two orthogonal axes.

8. The apparatus according to claim 5 wherein said flange includes at least one straight surface and said bracket includes at least one cooperating straight surface, whereby said flange is slid linearly into engagement with said bracket.

9. The apparatus according to claim 8 wherein said cooperating straight surface of said bracket is orientated parallel to said motor output shaft when said motor and said flange are slid into operative position with said bracket.

* * * * *